United States Patent [19]
Dubinsky

[11] Patent Number: 6,078,868
[45] Date of Patent: Jun. 20, 2000

[54] REFERENCE SIGNAL ENCODING FOR SEISMIC WHILE DRILLING MEASUREMENT

[75] Inventor: Vladimir Dubinsky, Houston, Tex.

[73] Assignee: Baker Hughes Incorporated, Houston, Tex.

[21] Appl. No.: 09/234,652

[22] Filed: Jan. 21, 1999

[51] Int. Cl.⁷ ................................ G01V 1/40
[52] U.S. Cl. .............................. 702/6; 702/14
[58] Field of Search .................. 702/6, 11, 14; 367/57

[56] References Cited

U.S. PATENT DOCUMENTS

| | | | |
|---|---|---|---|
| 4,926,393 | 5/1990 | McClellan et al. | 367/57 |
| 5,792,072 | 8/1998 | Keefe | 600/559 |
| 5,868,201 | 2/1999 | Bussear et al. | 166/53 |
| 5,899,958 | 5/1999 | Dowell et al. | 702/6 |
| 5,924,499 | 6/1999 | Birchak et al. | 175/40 |

*Primary Examiner*—Christine K. Oda
*Assistant Examiner*—Victor J. Taylor
*Attorney, Agent, or Firm*—Groover & Bachand P.C.

[57] ABSTRACT

A method for making seismic while drilling (SWD) measurements by determining and analyzing the reference signal downhole near the drill bit and sending a limited quantity of information to the surface by measurement-while-drilling (MWD) telemetry. In one embodiment, a library of anticipated drill bit wavelets is stored in memory downhole and in memory at the surface. The best matching wavelet is identified by the processor downhole and then a code identifying the wavelet and a scaling factor is sent to the surface. At the surface, the best matching wavelet is retrieved based on the code received and then a reconstructed signal is created using the retrieved wavelet and the scaling factor. In another embodiment, key characteristics of the signal such as central frequency, frequency band, etc., are calculated downhole and transmitted to the surface. These key characteristics are then used to reconstruct the reference signal which is then used for correlation of surface detected signals.

16 Claims, 4 Drawing Sheets

REFERENCE SIGNAL ENCODING FOR SEISMIC WHILE DRILLING MEASUREMENT

BACKGROUND AND SUMMARY OF THE INVENTION

The present invention relates to an improved method of determining, while drilling in the earth with a drill bit, the positions of geologic formations in the earth. More particularly, it relates to a method for improving the quality of a reference signal.

Conventional Reflection Seismology

Conventionally, reflection seismology utilized surface sources and receivers to detect reflections from subsurface impedance contrasts. The obtained image often suffered in spatial accuracy, resolution and coherence due to the long travel paths between source, reflector, and receiver. To overcome this difficulty, a technique commonly known as Vertical Seismic Profiling (VSP) was developed to image the subsurface in the vicinity of a borehole. With VSP, a source is suspended at a discrete borehole depth with a wireline and is activated to generate seismic signals. Field sensors are positioned at the surface to detect these seismic signals. Data is recorded and the process is repeated for several borehole depths. With the source positioned downhole, data can be acquired simultaneously at many surface locations with little more expense than for a single location. To reduce rig downtime, the drill bit was used as the source. However, because the drill bit signal is an uncontrolled pseudo-random process, a reference signal needs to be detected. Thus, in currently available methods of performing VSP, the signal generated by the drill bit travels up the drill string to the reference sensor and also propagates upward to the field sensors. By correlating the signal detected by the reference sensor with the signal detected by the field sensors, the travel time of the energy traveling from the drill bit to the field sensors may be determined. However, noise which is present in the reference signal will degrade the quality of the correlated signal.

Seismic While Drilling

One approach used in commercially available Seismic-While-Drilling (SWD) systems (e.g., TOMEX) to eliminate noise from the reference signal is through the use of an accelerometer 401 as the reference sensor. An example of a system utilizing an accelerometer is shown in FIG. 4. The signal generated by the drill bit 325 is used as a signal for seismic measurements and surface signals are recorded by an array of geophones 320 distributed around the drilling rig 301. The "reference signal", which is used for cross-correlation and following source signal detection, is recorded by an accelerometer 401 at the top of the drillstring 310. The accelerometer 401 has two sensors, one of which is sensitive to the noise but substantially insensitive to the acoustic signal transmitted up the drill string 310 from the source. The frequency band within which there is high coherence between the energy in the noise signal and the reference signal is determined. The noise signal is then amplified by a factor equal to the average ratio of the energy amplitude of the pilot signal to the noise signal within this frequency band, and this weighted noise signal is subtracted from the reference signal to reduce the noise in the reference signal. However, in many practical cases, the quality of the signal recorded at the top of the drillstring using an accelerometer is still very poor and still does not contain adequate information about the bit signature, especially for deviated extended reach wells. Often, even utilizing long term stacking (a method where, because the drill bit signal is not clear, the signal is averaged over a period of several minutes to extract a typical drill bit signature) does not improve the signal-to-noise ratio. Therefore, the results of SWD become unsatisfactory. Thus, there is a need to have a method for more accurately determining the reference signal.

Measurement-While-Drilling Telemetry

Measurement-While-Drilling (MWD) telemetry is a well known method for transmitting information between the bottom of the borehole and the surface. In MWD telemetry, information is transmitted by creating pressure pulses in the drilling fluid. This is performed by interrupting the flow of drilling fluid inside the pipe. At first glance, it might seem that the obvious solution to the problems of obtaining an improved reference signal lay in simply detecting the drill bit signal downhole near the drill bit and then transmitting this signal to the surface via MWD telemetry. However, MWD telemetry is limited to only a few bits per second. This is far below the rate of transmission needed to transmit to the surface the vast quantity of information needed in any representation of the waveform. Therefore, other approaches must be taken.

Improvement of Quality and Reliability of Seismic While Drilling (SWD) Measurements Due to Improvement of Quality of the Reference Signal The present application discloses a method for making seismic while drilling (SWD) measurements by determining and analyzing the reference signal downhole near the drill bit and sending information about the signal to the surface using a limited number of transmission bits. In one embodiment, a library of anticipated drill bit wavelets is stored in memory downhole and in memory at the surface. This library of anticipated drill bit wavelets is based on long term experience (several years) in collecting drill bit signals downhole and, in fact, could also be considered a data base of these collected drill bit signals. The best matching wavelet is identified by the processor downhole and then a code identifying the wavelet and a scaling factor are sent to the surface. At the surface, the best matching wavelet is retrieved based on the code received and then a reconstructed signal is created using the retrieved wavelet and the scaling factor. In another embodiment, key characteristics of the signal such as central frequency, frequency band, etc., are calculated downhole and transmitted to the surface. These key characteristics are then used to reconstruct the reference signal which is then used for correlation of surface detected signals.

The disclosed innovations, in various embodiments, provide one or more of at least the following advantages:

allows reference signal information to be sent to the surface using a limited number of bits since measurement-while-drilling (MWD) telemetry from downhole to the surface is limited to a few bits per second, provides a better reference signal for cross-correlation purposes than is provided by present methods, and provides a real time determination of the reference signal much faster (in around 1 minute) than the current method of utilizing long-term stacking which may take as long as 20 minutes.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

Borehole: a deep narrow circular hole, especially one made in the earth to find water, oil, etc.

Formation (or rock formation): earth strata of a particular type of rock or a combination of different rocks surrounding a borehole.

Measurement-While-Drilling: a procedure whereby measurements of downhole and surface parameters such as temperature, weight on bit, surface RPM, received energy, torque, etc. are taken as a drill is being operated in a bore hole.

Measurement-While-Drilling Telemetry: a method of transmitting information between the bottom of a borehole and the surface. Measurements are taken downhole and these measurements are encoded into 1's and 0's and transmitted to the surface as a signal. At the surface, these signals are decoded to retrieve information. One method for transmitting this information is by creating pressure pulses in the drilling fluid corresponding to the 1's and 0's. These pulses propagate through the borehole and are received by sensors at the surface. Other methods of transmission such as using electromagnetic or acoustic waves are also possible. Furthermore, the process may be reversed and information generated at the surface may be transmitted downhole as well.

Anticipated Bit Wavelet Library Method

Figure 1:
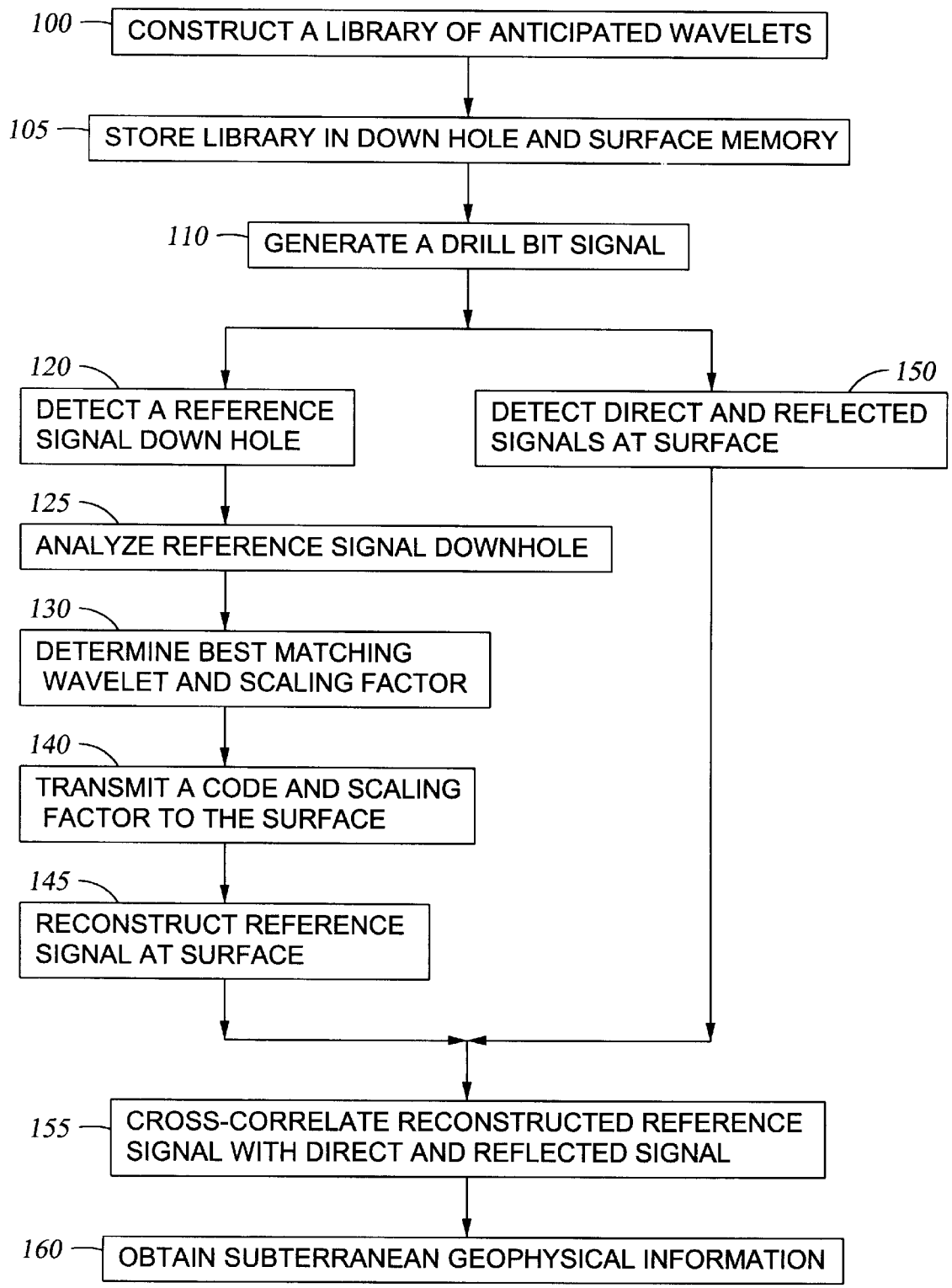
FIG. 1 shows a flow chart for the preferred method of obtaining a reference signal.

In FIG. 1 there is shown a flow chart of the presently preferred embodiment for obtaining a reference signal for use in Seismic While Drilling (SWD) measurements. A library of anticipated drill bit wavelets and a code corresponding to each wavelet is constructed (step 100). In one example, this library of anticipated drill bit wavelets is based on long term experience (several years) of collecting drill bit signals downhole and could be considered a data base of these collected drill bit signals. In this example, the library could contain 256 different wavelets. Of course the library could contain more or less wavelets depending on the requirements of the system user. This library is then stored in memory both down the borehole and at the surface (step 105). During drilling, the drill bit generates seismic vibrations (step 110). These seismic vibrations may be used to gain information about geologic formations in the vicinity of the drill bit while drilling.

Because the drill bit signal is an uncontrolled pseudo-random process, the signal generated by it needs to be determined to provide a reference signal to cross-correlate the collected data with so that the collected data can be effectively represented as if the source spectrum were controlled. Therefore, a reference signal (the signal generated by the drill bit) is detected down hole near the drill bit (step 120). The reference signal needs to be detected down hole rather than at the surface because the signal degrades as it travels up the drill string to the surface. By the time the reference signal reaches the surface, it does not contain adequate information about the drill bit signature (especially for deviated extended reach wells). This reference signal is then analyzed downhole (step 125). A best matching wavelet from the library along with a scaling factor are determined downhole (step 130). The scaling factor defines compression or stretching of the wavelet in time. A code corresponding to this best matching wavelet along with the scaling factor are then transmitted to the surface, typically using Measurement-While-Drilling (MWD) telemetry (step 140). By reducing the information transmitted to a code and a scaling factor, only two 8-bit words need to be sent to the surface. This is particularly important since MWD telemetry from downhole to the earth's surface is limited to a few bits per second. After the code and scaling factor are received at the surface, a processor reconstructs the reference signal based on the wavelet which corresponds to the code received and on the scaling factor (step 145).

The signals generated by the drill bit propagate, not only to the nearby downhole detector, but also away from the well bore and through the earth. With multiple reflecting layers (boundaries between different geologic formations), the signals generated by the drill bit propagate to the surface via various paths, i.e., by various direct and reflecting paths. These direct and reflected signals are then received by various detectors placed at known locations on the earth's surface (step 150). The sounds received by the surface detectors contain not only the signals associated with drilling, but also components which may be unrelated to drilling. The latter may include cultural noise such as from vehicles, people, animals, weather (wind and rain), etc. Therefore, the direct and reflected signals need to be corrected to account for these extraneous sources of sound. Thus, the direct and reflected signals are cross-correlated with the reconstructed reference signal to distinguish the drill bit generated signals from interference (step 155). These corrected direct and reflected signals can then be used to determine information about the subterranean formations around and near the borehole (step 160). Such information includes information that bears on the likelihood that hydrocarbons will be present in that location; information which is of particular importance in the petroleum exploration industry. Examples of methods for extracting such information from these signals may be found in U.S. Pat. No. 5,050,130 issued to Rector et al., U.S. Pat. No. 4,849,945 issued to Widrow, and U.S. Pat. No. 5,191,557 issued to Rector et al. all of which are hereby incorporated by reference. Those skilled in the art will be familiar with such methods.

Drill Rig

Figure 3:
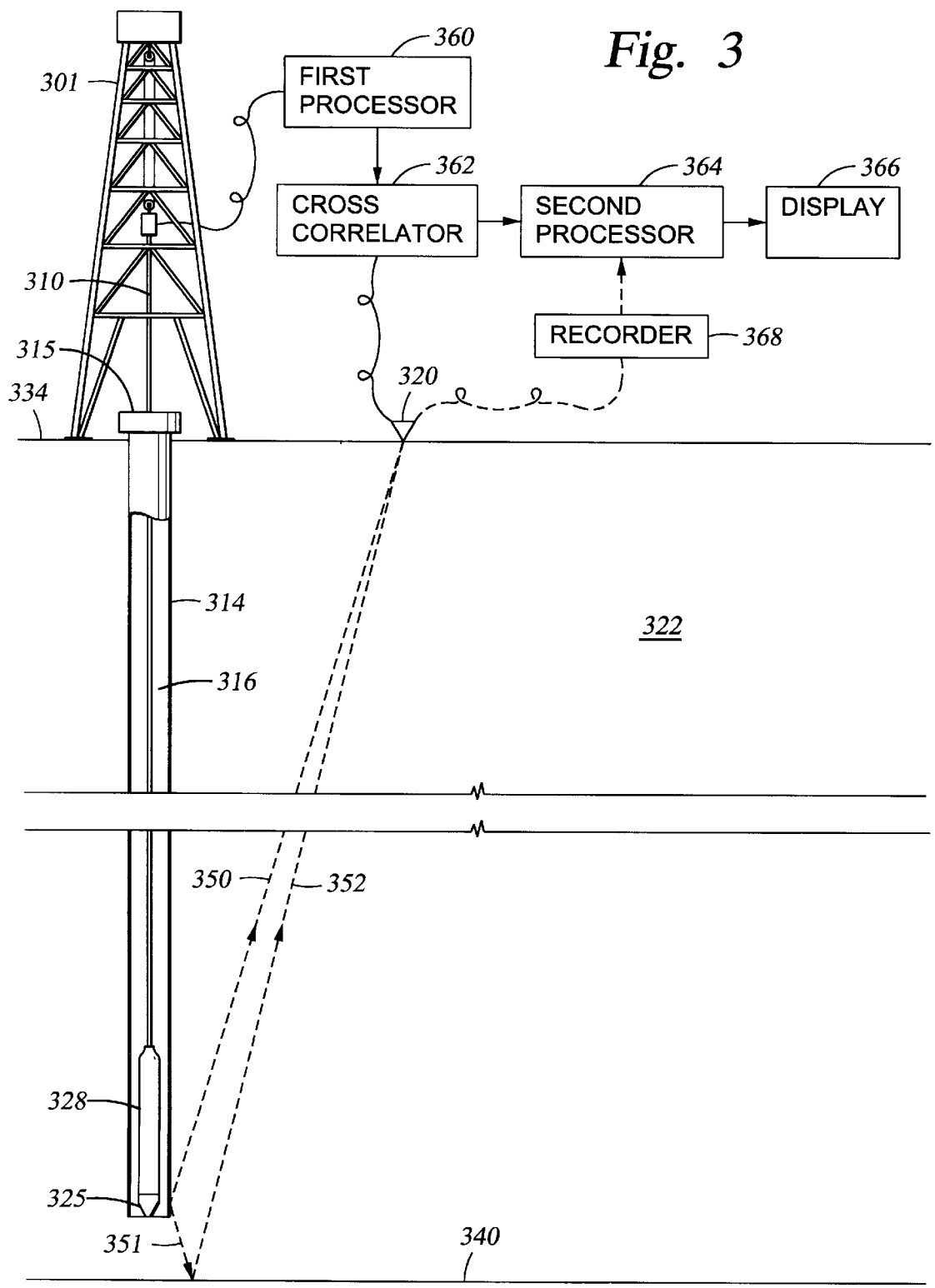
FIG. 3 shows a diagram of an apparatus for performing seismic while drilling measurements according to the presently disclosed methods.
Figure 4:
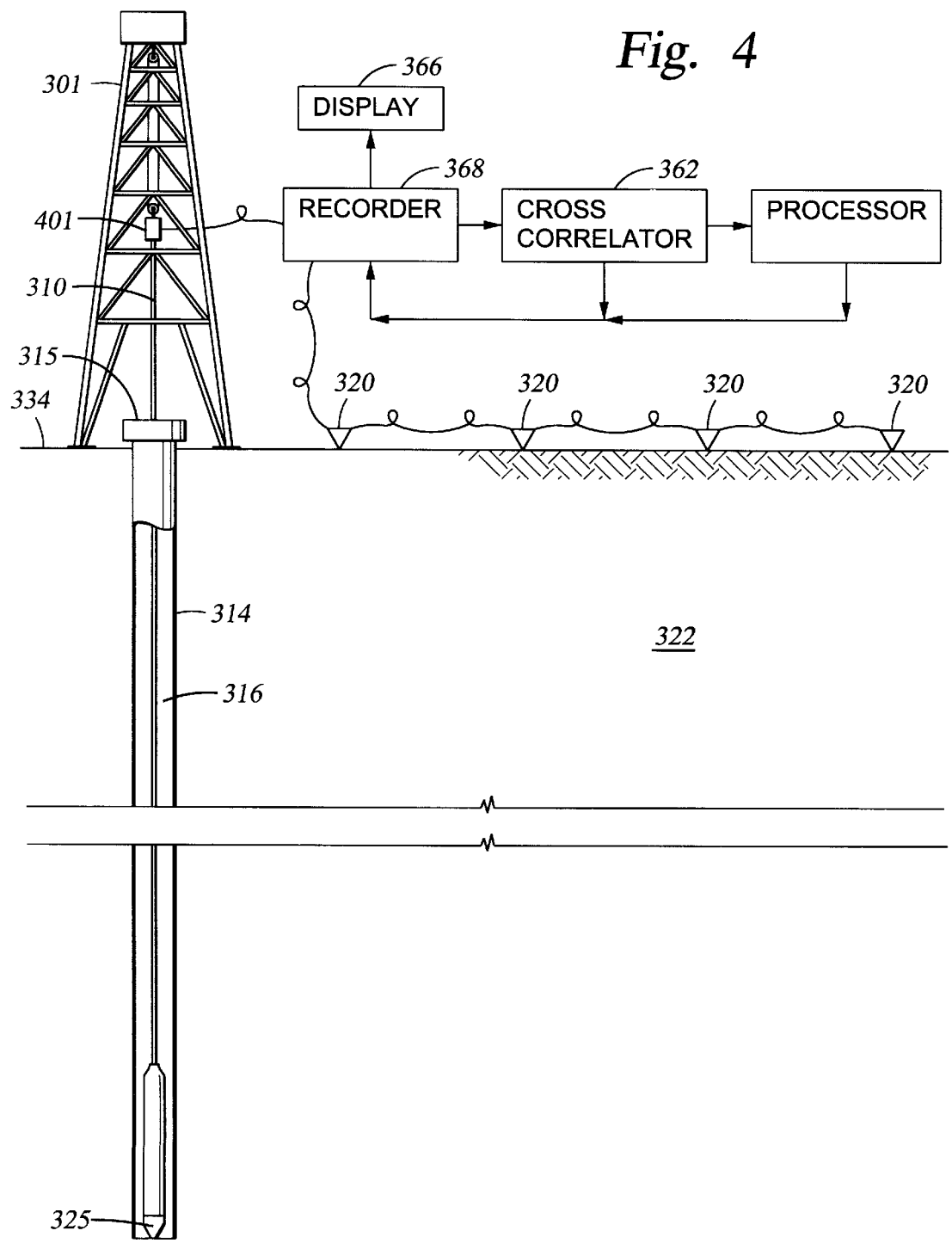
FIG. 4 shows a diagram of an apparatus for performing seismic while drilling measurements according to a prior method.

In FIG. 3 is shown a drill rig 301 and equipment suitable for performing the presently disclosed methods for obtaining a reference signal. Rig 301 supports a string of sectionalized drill pipe 310 in the well or borehole 314 which is usually filled with a fluid 316 such as drilling mud. A drill bit 325 is secured to the lower end of drill string 310. Also secured to the lower end of drill string 310 and just above the drill bit 325 are downhole electronics 328. The downhole electronics 328 include a processor, a receiver, and a transmitter and may include a recording device as well. The downhole electronics 328 need to be near the drill bit 325. In a typical example, the downhole electronics 328 would be between 10 and 20 feet from the drill bit 325. However, the downhole electronics 328 could be nearer or further from the drill bit 325, but, obviously, the nearer the downhole electronics 328 are to the drill bit 325, the better the quality of the reference signal obtained. The downhole electronics 328 can be configured to detect any acoustic mode desired. As an example, in the TOMEX system, both acoustic shear and compressional waves are detected.

In operation, the drill string 310 is rotated at a rate that depends upon the type of formation 322 being drilled. As the drill string 310 turns, the respective teeth of the drill bit 325 impact the bottom-hole formation to crush or disintegrate the rock at the bottom of the hole 314 to penetrate the formation 322 and also to produce a pseudorandom sequence of pulses. Some of the seismic energy that is generated by the drill bit radiates directly into the surrounding formation as compressional and shear wavefields. Some of the energy is detected by receivers located in the electronics section 328 downhole as a reference signal. A down hole processor in the electronics section 328 processes the signal to determine information about the reference signal such as key characteristics of the reference signal or the identity of the best matching wavelet from a library of anticipated wavelets stored in downhole memory. The down hole processor then transmits this information about the reference signal to a first processor 360 located at the surface 334. One method for transmitting this information to the surface processor 360 is by measurement-while-drilling (MWD) telemetry.

Receiver arrays 320 are located near the surface of the earth 334 in a substantially horizontal plane from the wellhead 315. Although shown in FIG. 3 with only one receiver array, multiple receiver arrays can and would normally be used in practice. An example of receivers 320 appropriate for this purpose are geophones. The receivers 320 detect seismic wavefields propagating through the subsurface earth formation 322. Some of these seismic wavefields travel along a direct path 350 from the drill bit to the receivers 320. Other seismic wavefields are detected by the receivers 320 which have traveled along a downward path 351 to a reflector 340 and then are reflected upward and travel along a reflected path 352 to the receivers 320. Optionally, if real time processing is not to be performed, the direct and reflected signals may be recorded by a recording device 368 which samples and records the signals for later processing.

The first processor 360 reconstructs the reference signal from key characteristics or codes transmitted to the surface from the downhole electronics 328. The reconstructed reference signal is sent to a cross correlator 362. The direct and reflected signals are also transmitted to the cross correlator 362 either directly from the receivers 320 or, optionally, from the recorder 368 depending on whether analysis will be performed in real time or at a later time. The cross correlator 362 then determines which part of the signal detected by the receivers 320 was generated by the drill bit and which part is extraneous noise and then eliminates the extraneous noise from the direct and reflected signals. The direct and reflected signals with extraneous noise eliminated is then sent to a second processor 364 where information about the subterranean formations is extracted and sent to a display 366.

Alternate Embodiment: Key Characteristics

Figure 2:
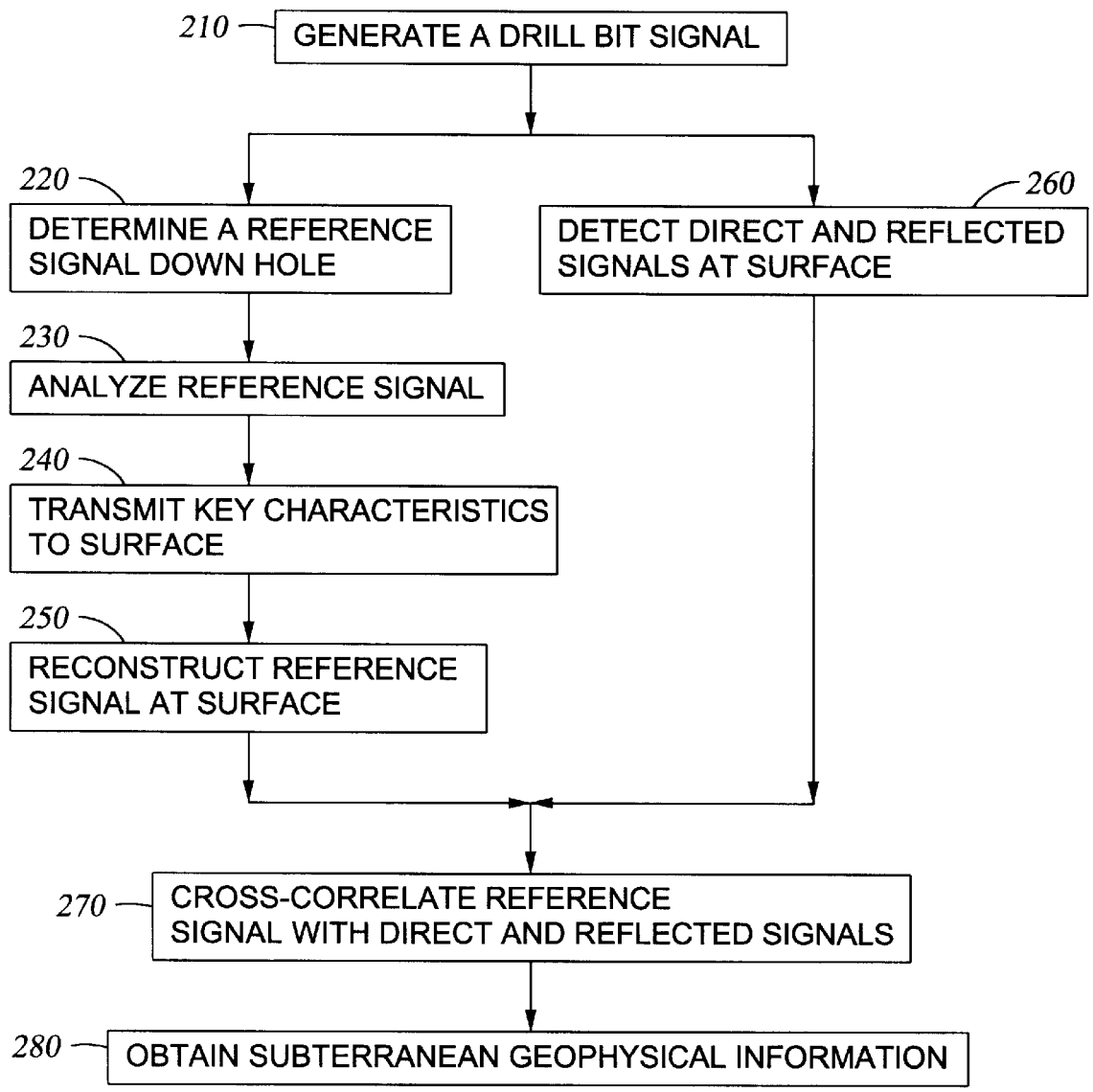
FIG. 2 shows a flow chart for an alternative method of obtaining a reference signal.

In an alternative embodiment, rather than transmitting a code corresponding to a wavelet in a library, key characteristics of the reference signal are transmitted to the surface. A flow chart for this key characteristic method is shown in FIG. 2. Again, a drill bit generates a signal (step 210). This drill bit signal is detected down hole near the drill bit to provide a reference signal (step 220). The reference signal is analyzed down hole to obtain key characteristics about the reference signal (step 230). The key characteristics of the reference signal are transmitted to the surface (step 240). Once the key characteristics are received by electronics at the surface, the reference signal is reconstructed based on these key characteristics (step 250). These key characteristics may include such information as the central frequency, the frequency band, and/or statistical parameters as well as any other information which may be determined to be relevant and necessary to reconstruct the reference signal to the appropriate level of accuracy at the surface as determined by the system user.

As previously mentioned in the discussion of the preferred embodiment, the signals generated by the drill bit propagate away from the well bore and through the earth and reach the earth's surface through various direct and reflected paths. These direct and reflected signals are then received by various detectors placed at known locations on the earth's surface (step 260). The direct and reflected signals are cross-correlated with the reconstructed reference signal to distinguish the drill bit generated signals from interference (step 270). These corrected direct and reflected signals can then be used to determine information about the subterranean formations around and near the borehole (step 280).

According to a disclosed class of innovative embodiments, there is provided: a data collection method, comprising the steps of: (a.) in a downhole processor, analyzing the acoustic signal generated by an operating drill bit to derive data therefrom; (b.) in at least one second processor, reconstructing a copy of said acoustic signal from said data, and using said copy as a reference signal, in combination with acoustic information detected at positions separate from said drill bit, to provide seismic characterization.

According to another disclosed class of innovative embodiments, there is provided: a seismic-while-drilling method, comprising the steps of: (a.) in a downhole processor, analyzing the acoustic signal generated by an operating drill bit to derive data therefrom; (b.) transmitting said data to at least one processor located at or near the earth's surface; (c.) reconstructing a copy of said acoustic signal from said data; and (d.) using said copy as a reference signal to interpret acoustic information detected at positions separate from said drill bit.

According to another disclosed class of innovative embodiments, there is provided: a method of gathering geophysical information; comprising: drilling a well bore with a drill bit which produces seismic energy; in a down hole processor, analyzing a reference signal generated by said drill bit to determine key characteristics of said reference signal; transmitting said key characteristics to the surface; obtaining a reconstructed reference signal at the surface based on said key characteristics; detecting a seismic signal at the surface; correlating said seismic signal with said reconstructed reference signal to obtain information about subterranean geologic formations.

According to another disclosed class of innovative embodiments, there is provided: a method of gathering geophysical information; comprising: creating a library of anticipated bit wavelets and storing said library in downhole memory and in surface memory; generating a reference signal down a borehole; analyzing said reference signal downhole to identify a code corresponding to a best matching wavelet from said library and a scale factor; transmitting said code and said scale factor to the surface; obtaining a reconstructed reference signal at the surface from said code and said scale factor; using said reconstructed reference signal to correlate said detected reference signal to determine geophysical information.

According to another disclosed class of innovative embodiments, there is provided: a system for seismic exploration; comprising: a downhole processor that analyzes the acoustic signal generated by an operating drill bit to derive data therefrom; a second processor operatively connected to receive said data; and at least one acoustic detector remote from said downhole processor; wherein said second processor is remote from said downhole processor and uses said data to interpret acoustic information received by at least one of said acoustic detector.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Although described with reference to a library of wavelets, other libraries of signal information could be maintained which could be used to transfer reference signal information to the surface using a minimum amount of transferred data.

Furthermore, although a few examples of key characteristics have been given, it will be obvious to those skilled in the art that other characteristics of a signal may be computed and transmitted to the surface which would enable the surface processor to reconstruct the reference signal.

Additionally, although described with reference to direct and reflected signals, it should be noted that useful information can be gathered from the direct signals alone using this technique.

Also, although described primarily with reference to onshore seismic exploration, the innovative teachings of this application can be applied to marine seismic exploration as well.

Other modifications will be obvious to those skilled in the art. Such modifications include but are not limited to adding an intervening transmitter between the transmitter at the bottom of the bore hole and the surface to boost the signal and adding recording devices down hole or at the surface to store information for later processing.

What is claimed is:

1. A data collection method, comprising:
   (a) in a downhole processor, analyzing an acoustic signal generated by an operating drill bit to derive data therefrom; and
   (b) in at least one second processor reconstructing a copy of said acoustic signal from said data, and using said copy as a reference signal, in combination with acoustic information detected at positions separate from said drill bit, to provide seismic characterization.

2. The method of claim 1, wherein said data comprises a code corresponding to a best matching wavelet in a library of wavelets.

3. The method of claim 1 wherein said data comprises a key characteristic of said reference signal.

4. The method of claim 3 wherein said key characteristic is at least one of (i) a central frequency of said acoustic signal, (ii) a frequency bandwidth of said acoustic signal, and (iii) a statistical parameter of said acoustic signal.

5. A seismic-while-drilling method, comprising the steps of:
   (a.) in a downhole processor, analyzing the acoustic signal generated by an operating drill bit to derive data therefrom;
   (b.) transmitting said data to at least one processor located at or near the earth's surface;
   (c.) reconstructing a copy of said acoustic signal from said data; and
   (d.) using said copy as a reference signal to interpret acoustic information detected at positions separate from said drill bit.

6. The method of claim 5, wherein said data comprises a code corresponding to a best matching wavelet in a library of wavelets.

7. The method of claim 5 wherein said data comprises a key characteristic of said reference signal.

8. The method of claim 7 wherein said key characteristic is at least one of (i) a central frequency of said acoustic signal, (ii) a frequency bandwidth of said acoustic signal, and (iii) a statistical parameter of said acoustic signal.

9. A method of gathering geophysical information, comprising:
   drilling a well bore with a drill bit which produces seismic energy;
   in a down hole processor, analyzing a reference signal generated by said drill bit during continuing drilling operations to determine key characteristics of said reference signal;
   transmitting said key characteristic to the surface;
   obtaining a reconstructed reference signal at the surface based on said key characteristics;
   detecting a seismic signal at the surface; and
   correlating said seismic signal with said reconstructed reference signal to obtain information about subterranean geologic formations.

10. The method of claim 9, wherein said key characteristics is at least one of (i) a central frequency of the reference signal, (ii) a frequency bandwidth of the reference signal, and (iii) a statistical parameter of the reference signal.

11. The method of claim 9, further comprising using said information about subterranean geologic formations for determining the presence and location of hydrocarbons.

12. A method of gathering geophysical information comprising:
   creating a library of anticipated bit wavelets and storing said library in a downhole memory and in a surface memory;
   generating a reference signal downhole;
   analyzing said reference signal downhole to identify a code corresponding to a best matching wavelet from said library and a scale factor;
   transmitting said code and said scale factor to a surface location;
   obtaining a reconstructed reference signal at the surface location from said transmitted code and said scale factor using said surface memory;
   using said reconstructed reference signal to correlate a detected signal to determine geophysical information.

13. The method of claim 12, wherein said detected signal is recorded using geophones positioned at a surface location.

14. A system for seismic exploration comprising:
   a downhole processor that analyzes an acoustic signal generated by an operating drill bit to derive data therefrom;
   a second processor operatively connected to receive said data; and
   at least one acoustic detector remote from said downhole processor; wherein
   said second processor is remote from said downhole processor and uses said data to interpret acoustic information received by the at least one acoustic detector.

15. The method of claim 14, wherein the at least one acoustic detector is a geophone located at the earth's surface.

16. The method of claim 14, wherein the at least one acoustic detector further comprises a plurality of spaced apart geophones located at the earth's surface.

* * * * *